US012756799B2

(12) United States Patent
Fung et al.

(10) Patent No.: US 12,756,799 B2
(45) Date of Patent: Oct. 6, 2026

(54) MULTI-PROJECTOR SYSTEM AND METHOD OF CALIBRATING MULTI-PROJECTOR SYSTEM

(71) Applicant: Coretronic Corporation, Hsin-Chu (TW)

(72) Inventors: Xuan-En Fung, Hsin-Chu (TW); Chun-Lin Chien, Hsin-Chu (TW); Yu-Wen Lo, Hsin-Chu (TW); Yu-Hua Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 292 days.

(21) Appl. No.: 18/474,203

(22) Filed: Sep. 25, 2023

(65) Prior Publication Data

US 2024/0114116 A1 Apr. 4, 2024

(30) Foreign Application Priority Data

Sep. 30, 2022 (CN) ......................... 202211217597.6

(51) Int. Cl.
*H04N 9/31* (2006.01)

(52) U.S. Cl.
CPC ......... *H04N 9/3147* (2013.01); *H04N 9/3182* (2013.01); *H04N 9/3194* (2013.01)

(58) Field of Classification Search
CPC .. H04N 9/3147; H04N 9/3155; H04N 9/3182; H04N 9/31-3197; G03B 21/00-64
See application file for complete search history.

(56) References Cited

U.S. PATENT DOCUMENTS

2010/0309391 A1* 12/2010 Plut ...................... H04N 9/3147 345/1.3
2011/0134332 A1 6/2011 Jaynes et al.
(Continued)

FOREIGN PATENT DOCUMENTS

| | | |
|---|---|---|
| CN | 108234975 | 6/2018 |
| CN | 107027013 | 8/2021 |
| TW | 201007337 | 2/2010 |

OTHER PUBLICATIONS

"Office Action of United Kingdom Counterpart Application", issued on Jun. 7, 2024, p. 1-p. 6.

*Primary Examiner* — Christopher A Lamb, II
(74) *Attorney, Agent, or Firm* — JCIPRNET

(57) ABSTRACT

A multi-projector system and a method of calibrating the multi-projector system are provided. The method includes: controlling a first projector to project a first image, and capturing and generating a first captured image including the first image to obtain a first color value from the first captured image through an image capturing device; projecting a second image according to a first projection parameter, and capturing and generating a second captured image including the second image to obtain a second color value from the second captured image through the image capturing device, wherein the first projection parameter includes an electrical parameter of a light source module of the second projector; calculating an absolute difference between the first color value and the second color value; and adjusting the first projection parameter to update the absolute difference in response to the absolute difference being greater than a first threshold.

12 Claims, 5 Drawing Sheets

(56) References Cited

U.S. PATENT DOCUMENTS

| | | | | |
|---|---|---|---|---|
| 2016/0088276 | A1* | 3/2016 | Lin | H04N 9/3194 348/207.1 |
| 2019/0268579 | A1 | 8/2019 | Oike et al. | |
| 2021/0136339 | A1 | 5/2021 | Kashiwagi et al. | |
| 2021/0392311 | A1* | 12/2021 | Ota | H04N 9/3147 |
| 2022/0141432 | A1* | 5/2022 | Maeda | H04N 9/3164 348/744 |

* cited by examiner

MULTI-PROJECTOR SYSTEM AND METHOD OF CALIBRATING MULTI-PROJECTOR SYSTEM

CROSS-REFERENCE TO RELATED APPLICATION

This application claims the priority benefit of China application serial no. 202211217597.6 filed on Sep. 30, 2022. The entirety of the above-mentioned patent application is hereby incorporated by reference herein and made a part of this specification.

BACKGROUND

Technical Field

The disclosure relates to a multi-projection technology, and particularly relates to a multi-projector system and a method of calibrating the multi-projector system.

DESCRIPTION OF RELATED ART

A user may use a plurality of projectors to project respective images, and splice the multiple images into a large-sized complete image. In order to make colors of the multiple images more consistent, a conventional calibration method is to use an illuminance meter to measure a color temperature of each image, and then manually adjust a parameter (such as a light source driving current) of the corresponding projector according to a measurement result, so that the color temperature/color of the image output by each projector is closer. However, the need for the illuminance meter may increase the cost of the conventional calibration method. Furthermore, the conventional calibration method may only be performed when the projectors are in an offline phase. Once the projectors are in an online phase and start playing the spliced complete image, the conventional calibration method cannot perform dynamic adjustments to maintain color consistency of each projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a multi-projector system for calibrating projectors and a method of calibrating projectors of the multi-projector system, which are adapted to dynamically adjust parameters of the projectors to make colors of images output by each of the projectors to be consistent.

The disclosure provides a multi-projector system for calibrating projectors. The multi-projector system includes an image capturing device, a first projector and a second projector. The second projector is communicatively connected to the image capturing device and the first projector, wherein the second projector is configured to perform: controlling the first projector to project a first image, and capturing and generating a first captured image including the first image by the image capturing device to obtain a first color value from the first captured image; projecting a second image according to a first projection parameter, and capturing and generating a second captured image including the second image by the image capturing device to obtain a second color value from the second captured image, wherein the first projection parameter includes an electrical parameter of a light source module of the second projector; calculating an absolute difference between the first color value and the second color value; and adjusting the first projection parameter to update the absolute difference in response to the absolute difference being greater than a first threshold.

The disclosure provides a method of calibrating projectors of a multi-projector system including: communicatively connecting a first projector and an image capturing device to a second projector; controlling the first projector to project a first image by the second projector, and capturing and generating a first captured image including the first image by the image capturing device to obtain a first color value from the first captured image; projecting a second image by the second projector according to a first projection parameter, and capturing and generating a second captured image including the second image by the image capturing device to obtain a second color value from the second captured image, wherein the first projection parameter includes an electrical parameter of a light source module of the second projector; calculating an absolute difference between the first color value and the second color value by the second projector; and adjusting the first projection parameter to update the absolute difference in response to the absolute difference being greater than a first threshold.

Based on the above description, the multi-projector system of the disclosure is adapted to dynamically correct the electrical parameter or an image display parameter of each projector, thereby making the colors of the images projected by the different projectors tend to be consistent.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
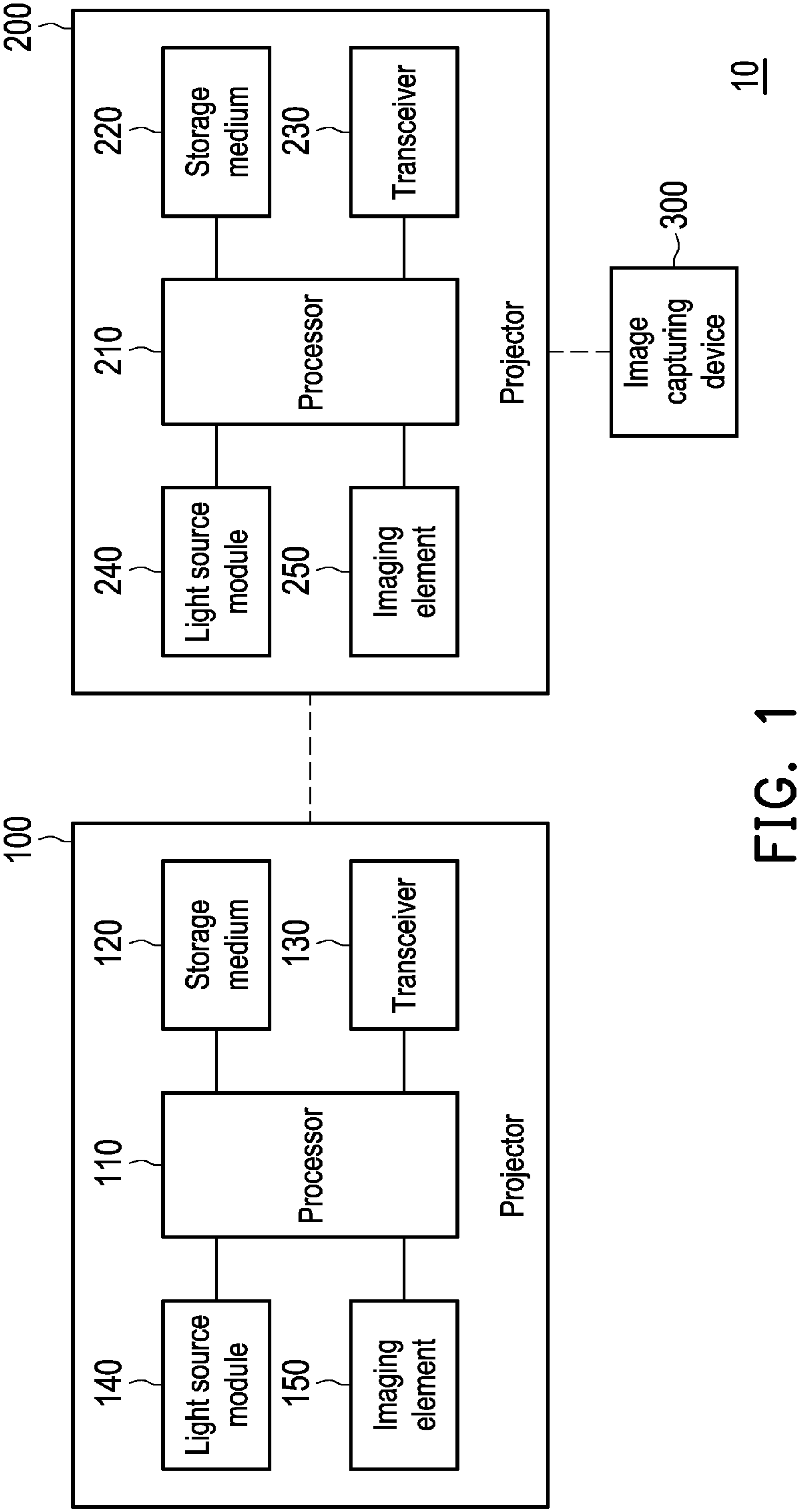
FIG. 1 is a schematic diagram of a multi-projector system for calibrating projectors according to an embodiment of the disclosure.

FIG. 1 is a schematic diagram of a multi-projector system 10 for calibrating projectors according to an embodiment of the disclosure. The multi-projector system 10 may include a projector 100, a projector 200 and an image capturing device 300, where the projector 200 may be communicatively connected to the projector 100 and the image capturing device 300. The projector 200 may dynamically correct parameters so that a color temperature of an image output by the projector 200 is close to a color temperature of an image output by the projector 100. It should be noted that the above function of dynamically correcting projection parameters may also be implemented by a computing device different from the projector 200, where the computing device may be independent from the projector 100 or the projector 200, or may be embedded in the projector 100 or the projector 200. For example, a user may communicatively connect the projector 100 and the projector 200 to a notebook computer or a host computer (not shown) with a computing function. Taking a notebook computer as an example, the notebook computer may dynamically adjust the parameters of the projector 200 so that the color temperature of the image output by the projector 200 is close to the color temperature of the image output by the projector 100, or the notebook computer may dynamically adjust the parameters of the projector 100 the parameters of the projector 100 so that the color temperature of the image output by the projector 100 is close to the color temperature of the image output by the projector 200. In addition, although the following embodiments assume that the multi-projector system 10 includes two projectors, the disclosure is not limited thereto. For example, the number of projectors in the multi-projector system 10 may be any positive integer greater than or equal to two.

The projector 100 may include a processor 110, a storage medium 120, a transceiver 130, a light source module 140, and an imaging element 150. In addition, the projector 100 further includes optical elements such as a projection lens, a lens, etc., and a detailed configuration of the projector 100 is known to those skilled in the art, and will not be described in detail.

The processor 110 is, for example, a central processing unit (CPU), or other programmable general-purpose or special-purpose micro control unit (MCU), a microprocessor (microprocessor), a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable logic gate array (FPGA) or other similar elements or a combination thereof. The processor 110 may be coupled to the storage medium 120, the transceiver 130, the light source module 140 and the imaging element 150 for controlling operations of the transceiver 130, the light source module 140 and the imaging element 150, and the processor 110 may access and execute a plurality of modules and various applications stored in the storage medium 120.

The storage medium 120 is, for example, any type of fixed or removable random access memory (RAM), a read-only memory (ROM), a flash memory, a hard disk drive (HDD), a solid state drive (SSD), or similar components or a combination thereof, and are used to store a plurality of modules or various applications that may be executed by the processor 110.

The transceiver 130 transmits and receives signals in a wireless or wired manner. The transceiver 130 may also perform operations such as low noise amplification, impedance, frequency mixing, up or down frequency conversion, filtering, amplification, etc.

The light source module 140 is used to provide a light beam required by the projector 100 to project an image. The processor 110 may transmit a control signal including an electrical parameter to the light source module 140 to adjust a luminous intensity of the light beam output by the light source module 140 or/and control turning on/off of light-emitting elements in the light source module 140. The electrical parameter may include, for example, a current value of a pulse-width modulation (PWM) signal. The greater the current value is, the greater the light intensity of the light beam is. The smaller the current value is, the smaller the light intensity of the light beam is. The light source module 140 may include one or more light-emitting elements such as one or more red laser diodes, one or more green laser diodes, one or more blue laser diodes, etc. To be more specific, the electrical parameters may include a PWM signal for controlling the red laser diodes, a PWM signal for controlling the green laser diodes, and a PWM signal for controlling the blue laser diodes. The processor 110 may use the aforementioned PWM signals to adjust a light intensity of a light beam of a specific color. For example, the processor 110 may use the PWM signal for controlling the red laser diodes and the PWM signal for controlling the green laser diodes to adjust a light intensity of a yellow light beam, or the processor 110 may adjust the light intensity of the yellow light beam by turning on or off a part of the red laser diodes and a part of the green laser diodes.

On the other hand, it is assumed that the light source module 140 includes an excitation light source (for example, a light-emitting element such as a blue laser diode) and a wavelength conversion device (such as a phosphor wheel), and the excitation light source and the wavelength conversion device have modes respectively corresponding to a red light period, a green light period, a blue light period and a yellow light period, and the electrical parameter (i.e., the PWM signal) may be changed along with different periods. For example, a current amplitude of the PWM signal used to control the blue laser diode during the red light period may be greater than its current amplitude during other periods (for example, the green light period, the blue light period, or the yellow light period), or control the light intensity of light emitted by the blue laser diode incident to the wavelength conversion device to obtain the color light required in the green light period or the yellow light period.

The imaging element 150 is, for example, a light valve. The imaging element 150 is used to modulate the light beam provided by the light source module 140 to generate an image light beam and form an image projected by the projector 100. In an embodiment, the imaging element 150 may be a digital micromirror device (DMD) or a liquid crystal panel. The processor 110 may transmit a digital signals including a digital parameter such as an image display parameter, etc., to the imaging element 150 to adjust a hue, a saturation and a gain of the image light beam.

The projector 200 may include a processor 210, a storage medium 220, a transceiver 230, a light source module 240, and an imaging element 250, where the processor 210 may be coupled to the storage medium 220, the transceiver 230, the light source module 240, and the imaging element 250. Functions and structures of the processor 210, the storage medium 220, the transceiver 230, the light source module 240 and the imaging element 250 are respectively the same as those of the processor 110, the storage medium 120, the transceiver 130, the light source module 140 and the imaging element 150, so that details thereof are not repeated.

The image capturing device 300 is, for example, an image sensor such as a complementary metal oxide semiconductor (CMOS) sensor or a charge coupled device (CCD) sensor, etc. The image capturing device 300 may be used to capture an image projected by the projector 100 or the projector 200 to generate a corresponding captured image. The image capturing device 300 may be independent to the projector 100 or the projector 200, or may be embedded in the projector 100 or the projector 200. It should be noted that although the following embodiments assume that the multi-projector system 100 includes only a single image capturing device, the disclosure is not limited thereto. For example, the multi-projector system 100 may include two image capturing devices respectively embedded in the projector 100 and the projector 200, where the image capturing device embedded in the projector 100 is used to capture the image projected by the projector 100 and generate a captured image, and the image capturing device embedded in the projector 200 is used to capture the image projected by the projector 200 and generate a captured image.

Figure 2:
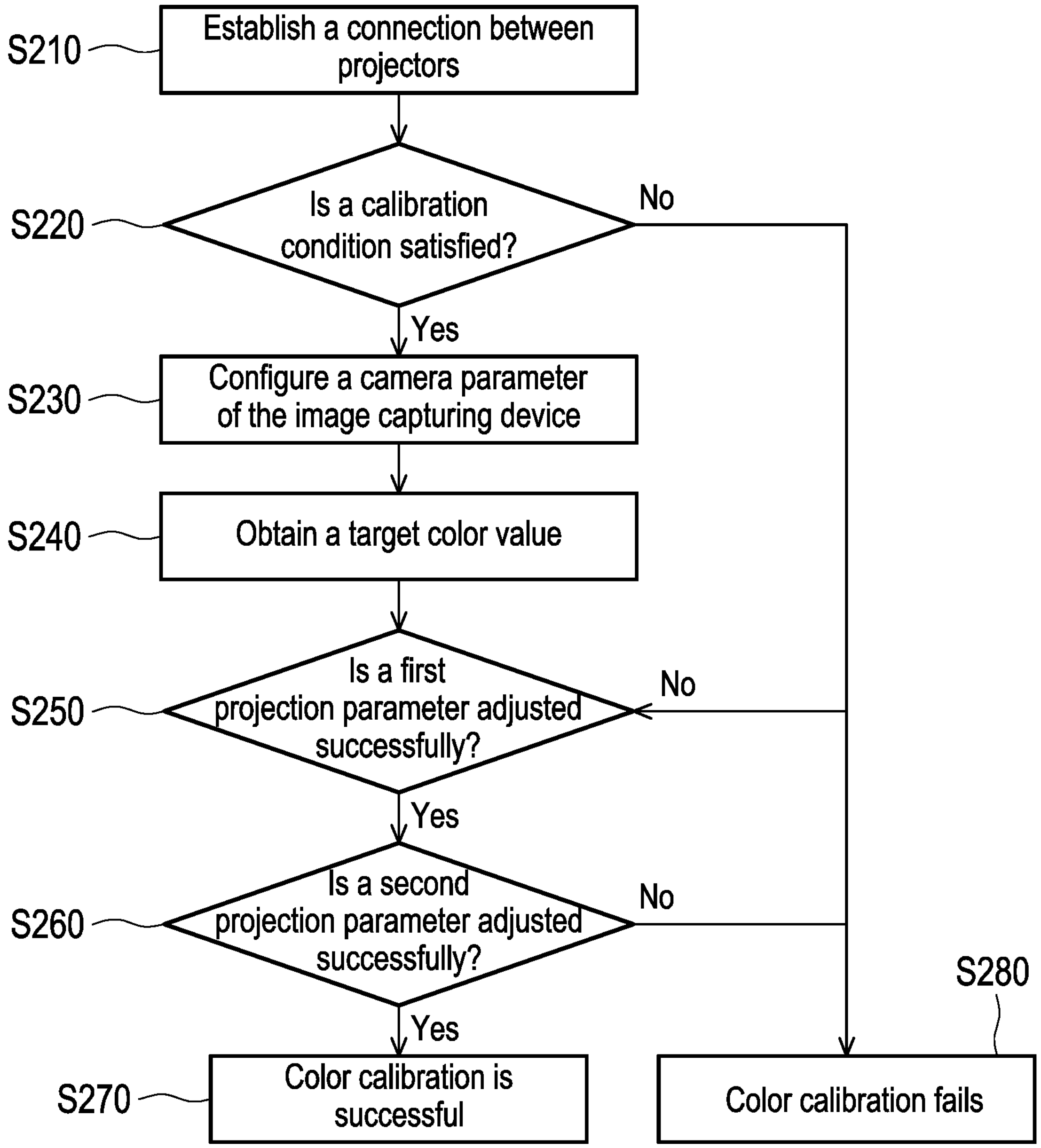
FIG. 2 is a flowchart of a method of calibrating a multi-projector system according to an embodiment of the disclosure.

FIG. 2 is a flowchart of a method of calibrating a multi-projector system according to an embodiment of the disclosure, where the method may be implemented by the multi-projector system 10 shown in FIG. 1. In step S210, the projector 200 may establish a connection with the projector 100. For example, the user may operate an on-screen display (OSD) menu of the projector 200 to input an Internet protocol (IP) address corresponding to the projector 100. The processor 210 of the projector 200 may establish the connection between the projector 200 and the projector 100 according to the IP address of the projector 100. The projector 100 and the projector 200 communicate with each other through the transceiver 130 and the transceiver 230 respectively, where the communication may be implemented through a wired communication protocol such as a local area network (LAN) interface or a universal serial bus (USB), etc., or through a wireless communication protocol such as a Wi-Fi communication interface or a Bluetooth communication interface, etc. In other embodiments, if the projector 100 and the projector 200 are communicatively connected to a notebook computer or a host computer with a computing function (not shown), through a projector list displayed by an application program on a display of the notebook computer or a display connected to the host computer, the projector 100 and projector 200 to be connected is selected from the projector list.

In step S220, the processor 210 of the projector 200 may determine whether a calibration condition of the multi-projector system 10 is satisfied. In the embodiment, the processor 210 of the projector 200 is used as an arithmetic device for dynamically calibrating projection parameters. If the processor 210 determines that the calibration condition is satisfied, step S230 is executed. If the processor 210 determines that the calibration condition is not satisfied, step S280 is then executed.

In order to achieve color consistency between the projector 100 and the projector 200, during the calibration process, the projector 100 and the projector 200 have to project images in similar environments. Accordingly, in an embodiment, the processor 210 may determine whether the condition for calibrating the multi-projector system 10 is satisfied according to projection areas of the projector 100 and the projector 200. Specifically, the processor 210 may control the projector 100 and the projector 200 to project respective images, and capture an image including a first projection area of the projector 100 and a second projection area of the projector 200 through the image capturing device 300 and generate a projection area captured image. The processor 210 may determine an overlapped area of the first projection area and the second projection area in the projection area captured image. If the overlapped area is greater than a predetermined value (for example: 90%), it means that the projector 100 and the projector 200 project images in a similar environment. Accordingly, the processor 210 may determine that the calibration condition of the multi-projector system 10 has been satisfied. Relatively, if the overlapped area is smaller than or equal to the predetermined value, it means that the projector 100 and the projector 200 project images in different environments (for example, conditions of projection surfaces are different), which leads to increase in a calibration error. Accordingly, the processor 210 may determine that the calibration condition of the multi-projector system 10 is not satisfied.

In step S230, the storage medium 220 of the projector 200 may configure/store camera parameters of the image capturing device 300, so that the image capture device 300 may reach a state suitable for calibrating the multi-projector system 10. Specifically, the storage medium 220 of the projector 200 may pre-store color value criteria for specific colors. The color value criteria for different colors may be the same or different. The color value criteria may include a color value upper limit, a color value lower limit, or a color value threshold. The processor 210 of the projector 200 may control the projector 100 to project a monochromatic image, and may generate a captured image including the monochromatic image through the image capturing device 300, so as to obtain a color value corresponding to the monochromatic image from the captured image. After obtaining the color value corresponding to the monochromatic image, the processor 210 may adjust camera parameters such as a white balance, an exposure value or a shutter speed, etc., of the image capturing device 300 according to the color value, so that the color value of the monochromatic image captured by the image capturing device 300 conforms to the color value criteria. The above-mentioned monochromatic image may include a white image, a red image, a green image or a blue image, but the disclosure is not limited thereto.

The processor 210 of the projector 200 may sequentially perform camera parameter adjustment on each color. However, in order to complete the white balance configuration of the image capturing device 300 first, the processor 210 may first perform camera parameter adjustment on white color. To be specific, the processor 210 may control the projector 100 to project a white image, and generate a captured image including the white image through the image capturing device 300, so as to obtain a color value corresponding to the white image from the captured image, where the color value of the white image may contain a red color value, a green color value, and a blue color value (RGB values or a ratio). The processor 210 may complete the white balance configuration of the image capturing device 300 according to the color value of the white image.

After the white balance configuration of the image capturing device 300 is completed, the processor 210 may sequentially perform camera parameter adjustment on each color. If the color value of the captured image of the image capturing device 300 (i.e., the monochromatic image projected by the projector 100) is too high or too low, it may cause the color value of the image projected by the projector (such as the projector 100 or the projector 200) to change inconspicuously, thus making color calibration more difficult. Accordingly, the processor 210 of the projector 200 may adjust the camera parameters of the image capturing device 300 according to the color value upper limit or the color value lower limit, so as to maintain the color value within an appropriate range.

In an embodiment, the processor 210 may adjust the exposure value or the shutter speed of the image capturing device 300 in response to the color value of the captured image being greater than the color value upper limit, thereby reducing the color value of the captured image, where the color value upper limit may be greater than the color value lower limit. For example, it is assumed that the green color value ranges from 0 to 255, the color value upper limit of the green color may be 240. The processor 210 may decrease the exposure value of the image capturing device 300 or increase the shutter speed of the image capturing device 300 in response to the green color value of the captured image being greater than 240, thereby reducing the green color value to be below 240. On the other hand, the processor 210 may adjust the exposure value or the shutter speed of the image capturing device 300 in response to the color value of the captured image being smaller than the color value lower limit, thereby increasing the color value of the captured image. For example, the color value lower limit of the green color may be 15. The processor 210 may increase the exposure value of the image capturing device 300 or decrease the shutter speed of the image capturing device 300 in response to the green color value of the captured image being smaller than 15, so as to increase the green color value to be above 15.

If the color value of the captured image of the image capturing device 300 is within an optimal range, change of the color value of the image projected by the projector (for example, the projector 100 or 200) may be more obvious, thereby improving a calibration result of color. Accordingly, the processor 210 of the projector 200 may adjust the camera parameters of the image capturing device 300 according to a color value threshold, so as to maintain the color value within the optimal range. In an embodiment, the processor 210 may adjust the exposure value or the shutter speed of the image capturing device 300 in response to the color value of the captured image being smaller than the color value threshold, thereby increasing the color value of the captured image, where the color value threshold may be smaller than the color value upper limit and greater than the color value lower limit. For example, it is assumed that the green color value ranges from 0 to 255, the color value threshold of green color may be 230. The processor 210 may increase the exposure value of the image capturing device 300 or decrease the shutter speed of the image capturing device 300 in response to the green color value of the captured image being smaller than 230, thereby increasing the green color value to be above 230.

After the adjustment and configuration of the camera parameters are completed, the projector 200 may sequentially execute the process including step S230 to step S260 for each color, so as to complete the calibration of each color corresponding to the projector 200, such that the projector 100 and the projector 200 may have a same or similar color performance when performing splicing projection. In other words, in order to calibrate various colors, the projector 200 may execute the process including steps S230 to S260 by multiple times. The multiple colors to be calibrated may include, but are not limited to, red, green, blue, cyan, yellow, magenta, or white (i.e., RGBCYMW).

In step S240, the processor 210 of the projector 200 may obtain and record a target color value corresponding to the projector 100. Specifically, the processor 210 may control the projector 100 to project an image, and generate a captured image including the projected image through the image capturing device 300, so as to obtain a target color value from the captured image. The processor 210 may control the image capturing device 300 to perform image capturing based on the camera parameters generated in step S230. The processor 210 may store the target color value in the storage medium 220 of the projector 200.

In step S250, the processor 210 of the projector 200 may adjust a first projection parameter of the projector 200 so that the color value of the image projected by the projector 200 approaches the color value of the image projected by the projector 100. The first projection parameter is, for example, light intensity, and the first projection parameter includes an electrical parameter (such as a current value or power of a PWM signal) of the light source module 240 of the projector 200. After the adjustment of the first projection parameter of the projector 200 is completed, the processor 210 may determine whether the adjustment of the first projection parameter is successful. If the processor 210 determines that the adjustment of the first projection parameter is successful, step S260 is executed. If the processor 210 determines that the adjustment of the first projection parameter fails, step S280 is executed.

Figure 3:
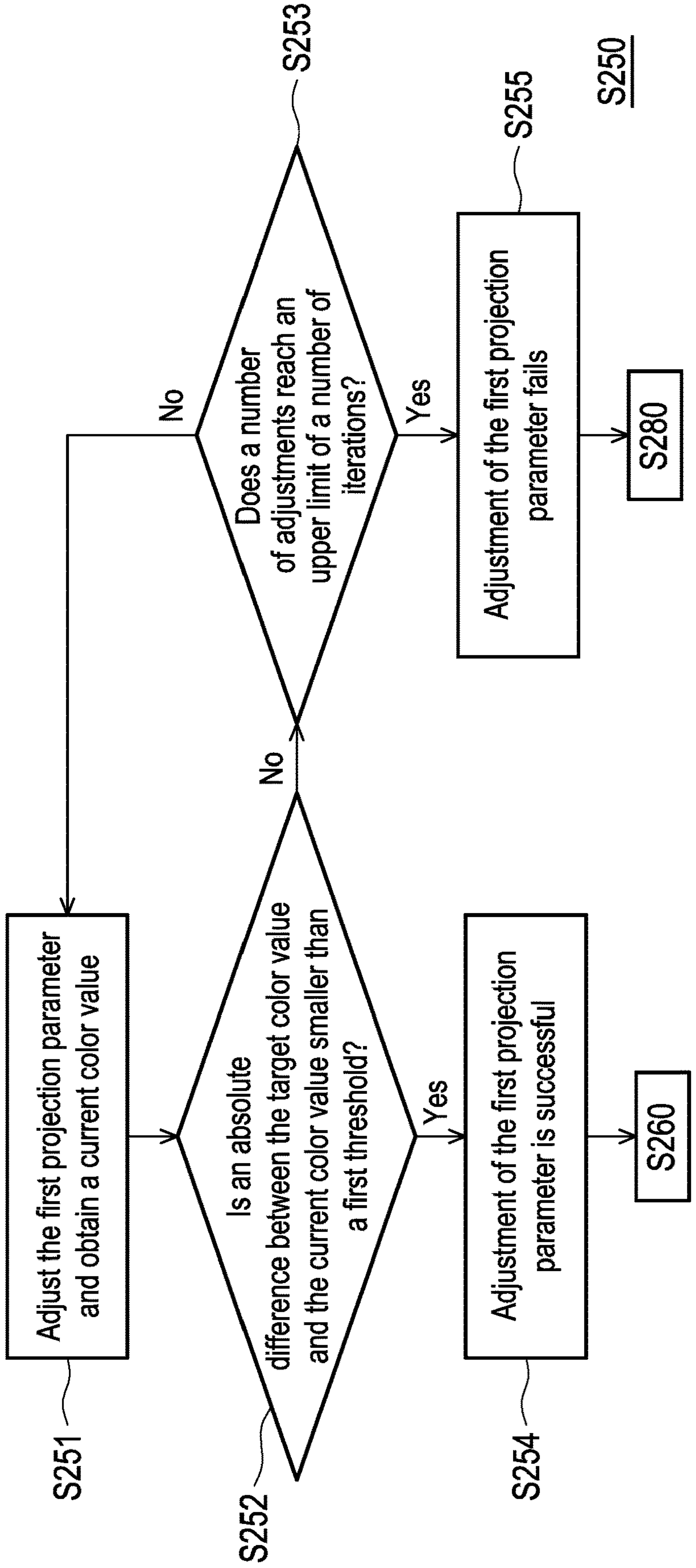
FIG. 3 is a detailed flowchart of step S250 according to an embodiment of the invention.

FIG. 3 is a detailed flowchart of step S250 according to an embodiment of the invention. In step S251, the processor 210 of the projector 200 may adjust the first projection parameter of the projector 200 (such as a current value or power of the PWM signal), and obtain a corresponding current color value through the image capturing device 300. If the processor 210 executes step S251 for the first time, the processor 210 may set the first projection parameter as an initial value. Specifically, the processor 210 may control the projector 200 to project an image according to the first projection parameter, and capture and generate a captured image including the projected image through the image capturing device 300, so as to obtain the current color value from the captured image. The processor 210 may control the image capturing device 300 to perform image capturing based on the camera parameter generated in step S230.

In step S252, the processor 210 of the projector 200 may calculate an absolute difference between the target color value and the current color value, and determine whether the absolute difference is smaller than a first threshold. If the absolute difference value is smaller than the first threshold, it means that the current color value is similar to the target color value, and the processor 210 may execute step S254 accordingly. If the absolute difference is greater than or equal to the first threshold, it means that the current color value is not similar to the target color value, and the processor 210 may execute step S253 accordingly.

In step S253, the processor 210 of the projector 200 may determine whether a number of adjustments of the first projection parameter reach an upper limit of the number of iterations. If the number of adjustments reaches the upper limit of the number of iterations, it means that the first projection parameter is difficult to converge, and the processor 210 may execute step S255 accordingly. If the number of adjustments does not reach the upper limit of the number of iterations, the processor 210 may return to step S251 and execute step S251 to adjust the first projection parameter of the projector 200 again (such as the current value or power of the PWM signal), and obtain the corresponding current color value again through the image capturing device 300, and adjust the first projection parameter to update the absolute difference between the target color value and the current color value.

In step S254, the processor 210 of the projector 200 may determine that the adjustment of the first projection parameter is successful, and then proceed to step S260. In step S255, the processor 210 of the projector 200 may determine that the adjustment of the first projection parameter fails, and then proceed to step S280.

Returning back to FIG. 2, in step S260, the processor 210 of the projector 200 may adjust a second projection parameter of the projector 200 to fine tune the color value of the image projected by projector 200 to be closer to the color value of the image projected by projector 100. The second projection parameter is, for example, a hue, a saturation or a gain, and the second projection parameter includes a digital parameter of the imaging element 250 of the projector 200, where the digital parameter includes an image display parameter input to the imaging element 250. For example, the digital parameter is adjusted through a color setting function of software. After the adjustment of the second projection parameter of the projector 200 is completed, the processor 210 may determine whether the adjustment of the second projection parameters is successful. If the processor 210 determines that the adjustment of the second projection parameter is successful, step S270 is executed. If the processor 210 determines that the adjustment of the second projection parameter fails, step S280 is executed.

Figure 4:
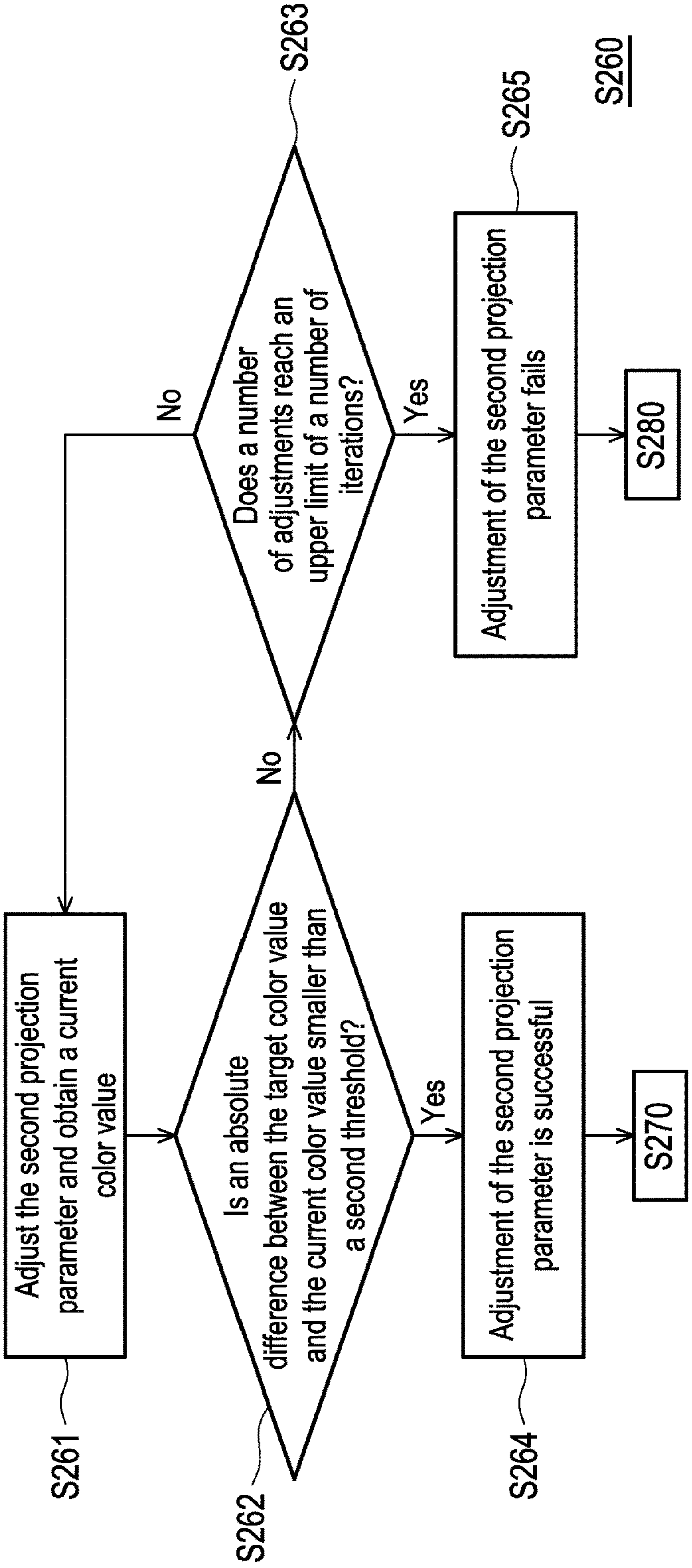
FIG. 4 is a detailed flowchart of step S260 according to an embodiment of the invention.

FIG. 4 is a detailed flowchart of step S260 according to an embodiment of the invention. In step S261, the processor 210 of the projector 200 may adjust a second projection parameter (for example, a hue, a saturation or a gain value) of the projector 200, and obtain the corresponding current color value. Digital adjustment of the second projection parameter is, for example, performed through a color setting function of software of the processor 210 or the storage medium 220 built in the projector 200. If the processor 210 executes step S261 for the first time, the processor 210 may set the second projection parameter as an initial value. Specifically, the processor 210 may control the projector 200 to project an image according to the second projection parameter and the adjusted first projection parameter, and use the image capturing device 300 to capture and generate a captured image including the projected image, so as to obtain the current color value from the captured image. The processor 210 may control the image capturing device 300 to perform image capturing based on the camera parameter generated in step S230.

In step S262, the processor 210 of the projector 200 may calculate the absolute difference between the target color value and the current color value, and determine whether the absolute difference is smaller than a second threshold, where the second threshold may be smaller than the first threshold mentioned in step S252. If the absolute difference is smaller than the second threshold, it means that the current color value is very similar to the target color value, and the processor 210 may proceed to step S264 accordingly. If the absolute difference is greater than or equal to the second threshold, it means that the current color value is not very similar to the target color value, and the processor 210 may execute step S263 accordingly.

In step S263, the processor 210 of the projector 200 may determine whether the number of adjustments of the second projection parameter reach an upper limit of the number of iterations. If the number of adjustments reaches the upper limit of the number of iterations, it means that the second projection parameter is difficult to converge, and the processor 210 may execute step S265 accordingly. If the number of adjustments does not reach the upper limit of the number of iterations, the processor 210 may return to step S261 and execute step S261 to adjust the second projection parameter of the projector 200 again, and again obtain the corresponding current color value through the image capturing device 300, and update the absolute difference between the target color value and the current color value by adjusting the second projection parameter.

In step S264, the processor 210 of the projector 200 may determine that the adjustment of the second projection parameter is successful, and then proceeds to step S270. In step S265, the processor 210 of the projector 200 may determine that the adjustment of the second projection parameter fails, and then proceed to step S280.

Referring back to FIG. 2, in step S270, the processor 210 of the projector 200 may determine that the color calibration of the multi-projector system 10 is successful, and then perform a subsequent splicing projection operation of the multi-projector system. In step S280, the processor 210 of the projector 200 may determine that the color calibration of the multi-projector system 10 is failed.

Figure 5:
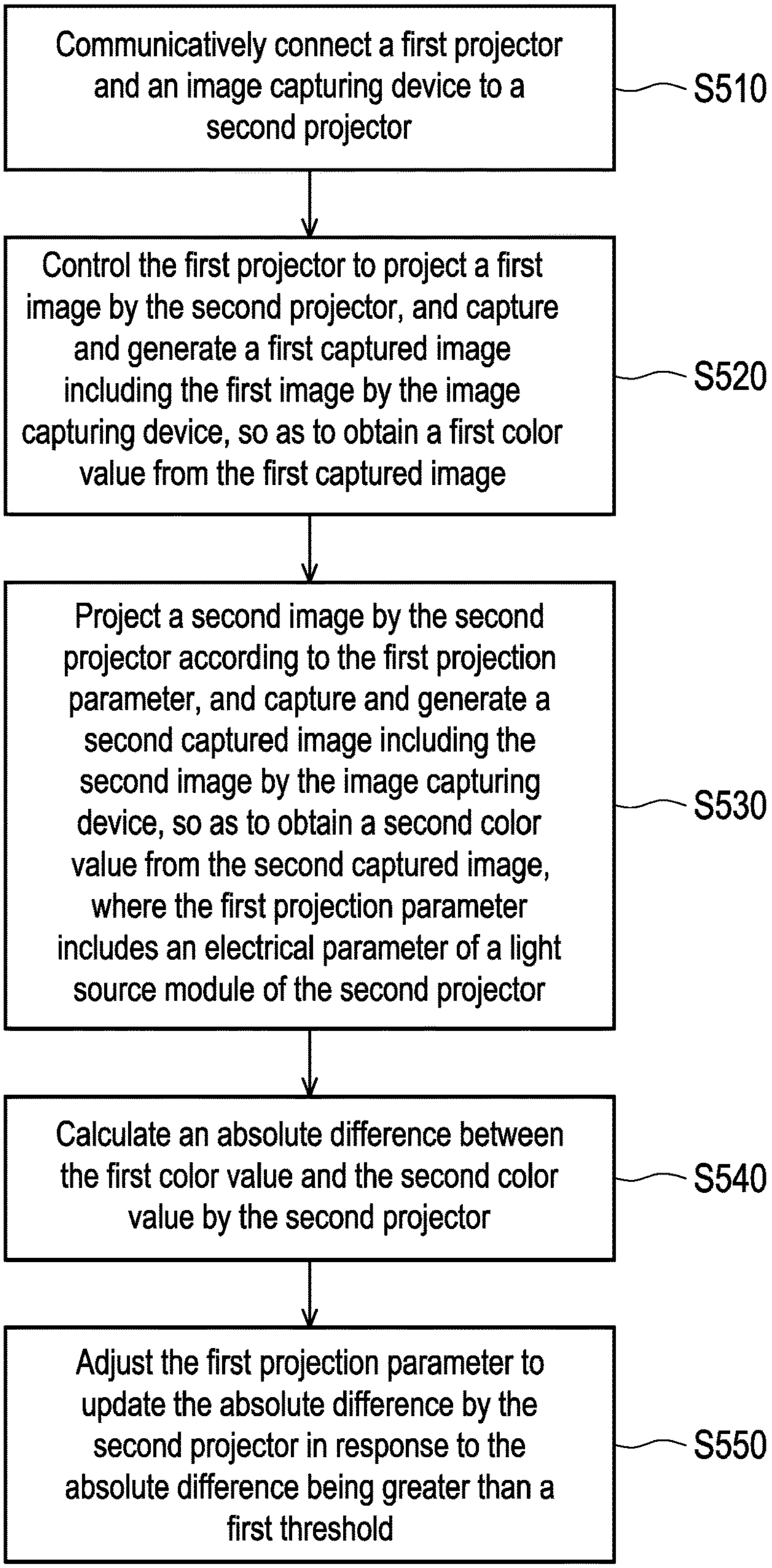
FIG. 5 is a flowchart of a method for calibrating projectors of a multi-projector system according to an embodiment of the disclosure.

FIG. 5 is a flowchart of a method for calibrating projectors of a multi-projector system according to an embodiment of the disclosure, where the method may be implemented by the multi-projector system 10 shown in FIG. 1. In step S510, a first projector and an image capturing device are communicatively connected to a second projector. In step S520, the second projector controls the first projector to project a first image, and the image capturing device captures and generates a first captured image including the first image, so as to obtain a first color value from the first captured image. In step S530, the second projector projects a second image according to the first projection parameter, and captures a second captured image including the second image through the image capturing device, so as to obtain a second color value from the second captured image, where the first projection parameter includes an electrical parameter of a light source module of the second projector. In step S540, the second projector calculates an absolute difference between the first color value and the second color value. In step S550, the second projector adjusts the first projection parameter to update the absolute difference in response to the absolute difference being greater than a first threshold.

In summary, the multi-projector system of the invention may obtain the color values of the monochromatic images output by each projector in the system through the image capturing device, and determine whether to adjust the projection parameters of the projectors according to the absolute difference between the color values. The disclosure may firstly adjust the electrical parameter (for example, the current value or power of the PWM signal) of the light source module of the projector to make the color values output by the projectors quickly approaching to each other, and then fine-tune more detailed parameters such as a hue, a saturation and a gain value of the projector through software to make the color values output by each of the projectors closer. Therefore, even if projectors with different specifications are configured in the multi-projector system, the spliced image projected by the multi-projector system may still maintain color consistency. In addition, the disclosure may use a general camera to replace the illuminance meter used in the conventional projector calibration method, thereby reducing the cost of the multi-projector system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A multi-projector system, comprising: a projector, wherein the projector comprises a light source module, a processor, and an imaging element, and the processor is electrically coupled to the light source module and the imaging element, wherein the processor is configured to perform:

communicatively connecting to an image capturing device and an external projector;

controlling the external projector to project a first image;

obtaining a first color value from a first captured image, wherein the first captured image comprising the first image is captured and generated by the image capturing device;

projecting a second image according to a first projection parameter and a second parameter, wherein the first projection parameter comprises an electrical parameter of the light source module of the projector and the second projection parameter comprises an image display parameter input to the imaging element of the projector;

obtaining a second color value from a second captured image, wherein the second captured image comprising the second image is captured and generated by the image capturing device;

calculating an absolute difference between the first color value and the second color value;

adjusting the first projection parameter to update the absolute difference in response to the absolute difference being greater than a first threshold;

determining whether the absolute difference is greater than a second threshold in response to the absolute difference being smaller than or equal to the first threshold, wherein the second threshold is smaller than the first threshold; and adjusting the second projection parameter to update the absolute difference in response to the absolute difference being greater than the second threshold.

2. The multi-projector system as claimed in claim 1, wherein the electrical parameter of the projector comprises a current value or a power used to adjust the light source module, wherein a digital parameter of the imaging element of the projector comprises the image display parameter input to the imaging element, and the second projection parameter comprises a hue, a saturation and a gain value.

3. The multi-projector system as claimed in claim 1, wherein the processor is further configured to perform:

determining an overlapped area of a first projection area and a second projection area in a projection area captured image, wherein the projection area captured image comprising the first projection area projected by the external projector and the second projection area projected by the projector is captured and generated by the image capturing device; and controlling the external projector to project the first image in response to the overlapped area being greater than a predetermined value.

4. The multi-projector system as claimed in claim 1, wherein the processor is further configured to perform:

adjusting the second projection parameter to update the absolute difference in response to the absolute difference being greater than the second threshold and a number of adjustments of the second projection parameter having not reached an upper limit of a number of iterations.

5. The multi-projector system as claimed in claim 1, wherein the light source module of the projector comprises a red laser diode, a green laser diode and a blue laser diode, wherein the first projection parameter corresponds to the electrical parameter of the red laser diode, the electrical parameter of the green laser diode, and the electrical parameter of the blue laser diode.

6. The multi-projector system as claimed in claim 1, wherein the light source module of the projector comprises an excitation light source and a wavelength conversion device respectively having a red light period, a green light period, a blue light period, and a yellow light period, wherein the first projection parameter respectively corresponds to the electrical parameter of the light source module in the red light period, the green light period, the blue light period and the yellow light period.

7. A multi-projector system, comprising: a projector, wherein the projector comprises a light source module and a processor, and the processor is electrically coupled to the light source module, wherein the processor is configured to perform:

communicatively connecting to an image capturing device and an external projector;

controlling the external projector to project a first image;

obtaining a first color value from a first captured image, wherein the first captured image comprising the first image is captured and generated by the image capturing device;

projecting a second image according to a first projection parameter, wherein the first projection parameter comprises an electrical parameter of the light source module of the projector;

obtaining a second color value from a second captured image, wherein the second captured image comprising the second image is captured and generated by the image capturing device;

calculating an absolute difference between the first color value and the second color value;

adjusting the first projection parameter to update the absolute difference in response to the absolute difference being greater than a first threshold;

controlling the external projector to project a monochromatic image;

obtaining at least one color value from a third captured image, wherein the third captured image comprising the monochromatic image is captured and generated by the image capturing device;

adjusting a camera parameter of the image capturing device according to the at least one color value; and capturing the first image and the second image according to the camera parameter.

8. The multi-projector system as claimed in claim 7, wherein the camera parameter comprises at least one of a white balance, an exposure value, and a shutter speed.

9. The multi-projector system as claimed in claim 8, wherein the processor is further configured to perform:

adjusting at least one of the exposure value of the image capturing device and the shutter speed of the image capturing device to reduce the at least one color value in response to the at least one color value being greater than a color value upper limit; and adjusting at least one of the exposure value and the shutter speed to increase the at least one color value in response to the at least one color value being smaller than a color value lower limit.

10. The multi-projector system as claimed in claim 9, wherein the monochromatic image is a white image, wherein the processor is further configured to perform:

adjusting at least one of the exposure value and the shutter speed to increase the at least one color value in response to the at least one color value being smaller than a color value threshold, wherein the color value threshold is smaller than the color value upper limit and greater than the color value lower limit.

11. A multi-projector system, comprising a projector, wherein the projector comprises a light source module and a processor, the processor is electrically coupled to the light source module, and the processor is configured to perform:

communicatively connecting to an image capturing device and an external projector;

controlling the external projector to project a first image;

obtaining a first color value from a first captured image, wherein the first captured image comprising the first image is captured and generated by the image capturing device;

projecting a second image according to a first projection parameter, wherein the first projection parameter comprises an electrical parameter of the light source module of the projector;

obtaining a second color value from a second captured image, wherein the second captured image comprising the second image is captured and generated by the image capturing device;

calculating an absolute difference between the first color value and the second color value; and adjusting the first projection parameter to update the absolute difference in response to the absolute difference being greater than a first threshold and a number of adjustments of the first projection parameter having not reached an upper limit of a number of iterations.

12. A calibrating method performed by a projector of a multi-projector system, comprising:

communicatively connecting an external projector and an image capturing device to the projector;

controlling the external projector to project a first image by the projector;

obtaining a first color value from a first captured image by the projector, wherein the first captured image comprising the first image is captured and generated by the image capturing device;

projecting a second image by the projector according to a first projection parameter and a second projection parameter, wherein the first projection parameter comprises an electrical parameter of a light source module of the projector and the second projection parameter comprises an image display parameter input to an imaging element of the projector;

obtaining a second color value from a second captured image by the projector, wherein the second captured image comprising the second image is captured and generated by the image capturing device;

calculating an absolute difference between the first color value and the second color value by the projector;

adjusting the first projection parameter to update the absolute difference in response to the absolute difference being greater than a first threshold by the projector;

determining, by the projector, whether the absolute difference is greater than a second threshold in response to the absolute difference being smaller than or equal to the first threshold, wherein the second threshold is smaller than the first threshold; and adjusting the second projection parameter to update the absolute difference in response to the absolute difference being greater than the second threshold by the projector.

* * * * *